Feb. 27, 1951 H. G. SCHWARZ 2,543,304
CIRCUIT FOR MAINTAINING ASPECT RATIO CONSTANT
Filed Dec. 8, 1949
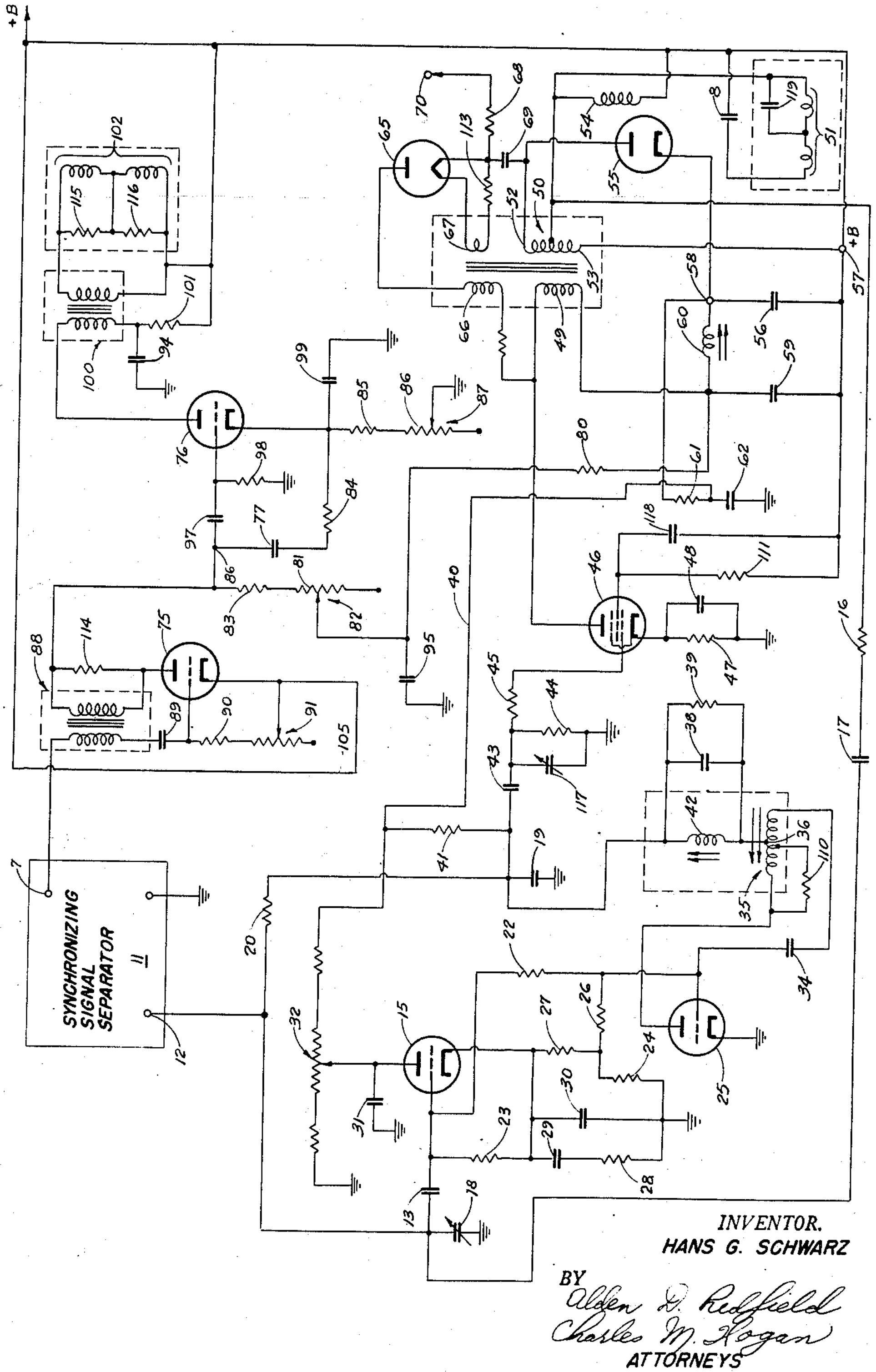
INVENTOR.
HANS G. SCHWARZ
BY
Alden D. Redfield
Charles M. Hogan
ATTORNEYS Patented Feb. 27, 1951

2,543,304

UNITED STATES PATENT OFFICE 2,543,304

CIRCUIT FOR MAINTAINING ASPECT RATIO CONSTANT

Hans G. Schwarz, Cincinnati, Ohio, assignor to Avco Manufacturing Corporation, Cincinnati, Ohio, a corporation of Delaware Application December 8, 1949, Serial No. 131,718

8 Claims. (Cl. 315—27)

The present invention relates to a circuit for maintaining constant the shape or ratio of width to height of the image raster of a television receiver, even in the presence of fluctuations in the anode voltage applied to the cathode ray tube. It is postulated that the deflection sensitivity of a cathode ray beam decreases as the anode-to-cathode voltage of the tube increases. Conversely, a decrease in the high voltage supply potential tends to cause an increase in picture size —Reich, Theory and Applications of Electron Tubes, p. 631, second edition, McGraw-Hill Book Co., Inc., New York, 1944; M. I. T. Staff, Applied Electronics, p. 21, John Wiley & Sons, Inc., New York, 1943. As stated in U. S. Patent No. 2,449,787 to Otto H. Schade, the impedance of the anode circuit of the cathode ray tube varies in accordance with video signal content. As picture brightness decreases, for example, the amount of beam current drawn from the high voltage supply decreases and the impedance of this anode circuit increases. As brightness increases, this impedance decreases. When a very bright scene is reproduced, the cathode ray tube accelerating electrode voltage appreciably decreases, resulting in a distortion or expansion of the image raster. The present invention is broadly directed to the prevention of picture size changes, and particularly picture height changes.

The "Fly-Back" type of high voltage supply has become very generally accepted. In this supply system, a rectified and filtered voltage generated at the ouput of the horizontal or line deflection circuit is utilized as the high potential applied to the accelerating or second anode of the cathode ray tube. This system is fully described in the following patents and publications:

U. S. Patent 2,051,372 to Farnsworth;

U. S. Patent 2,074,495 to Vance;

Basic Television, Grob, pp. 168–170, first edition, McGraw-Hill Book Co., Inc., New York, 1949;

Television Simplified, Kiver, pp. 207–213, second edition, D. Van Nostrand Co., Inc., New York, 1948.

When a flyback supply is employed, a decrease in deflection-producing current in the horizontal output transformer tends to produce a decrease in the extent of horizontal deflection. However, such current decrease also tends to produce a decrease in the picture tube anode voltage which in turn increases the deflection sensitivity of the tube. A change in deflection current can be balanced against the resultant change in deflection sensitivity to maintain constant the width of the picture. The choice of components for accomplishing this purpose and utilizing these compensatory phenomena is presently well within the skill of the calling, and no particular difficulty is now being experienced in maintaining horizontal deflection constant. However, this change in deflection sensitivity, caused by a fluctuation in picture tube anode voltage, is not conventionally accompanied by a change in vertical deflection current, so that a decrease in horizontal deflection current or a decrease in that anode voltage, for example, tends to increase the height of the picture, resulting in distortion. The present invention is more specifically directed to the elimination of this effect and to the provision of means cooperating with the vertical deflecting circuit in such a way as automatically to produce a change in vertical deflecting current, the effect of which compensates for the effect of change of anode potential, so far as picture height is concerned, whereby the aspect ratio $$\left(\frac{\text{picture height}}{\text{picture width}}\right)$$

is maintained constant.

Since the voltage regulation of a flyback power supply system is very poor, the problem solved by the present invention is of importance and a number of endeavors to solve it have been made. A typical approach involves the use of a very high resistor for combining the high voltage generated by the flyback supply with a steady potential and the use of the resultant voltage to control the peak amplitude of the vetrical power tube output. A limitation of this circuit resides in the fact that a very large and expensive resistor must be provided between the rectifier and the steady potential source. In commercial practice such a resistor is very sensitive to humidity change. A further limitation is caused by the fact that the means for controlling the vertical power tube output requires a substantial current and heavily loads the high voltage rectifier included in the flyback voltage supply. The primary object of the invention is to provide an aspect-ratio constancy-maintaining circuit which utilizes an available source of current without imposing a load on the high voltage rectifier and without requiring the use of an expensive resistor component.

In the figure there is shown a synchronizing signal separator 11 (block form) and a horizontal deflecting system which, for purposes of the present discussion, is assumed to be prior art. It is fully disclosed in the copending patent application, Serial No. 102,176 of Francis A.

Wissel and Norman W. Parker, filed in the United States Patent Office on June 30, 1949, entitled "Automatic Gain Control" and assigned to Avco Manufacturing Corporation, of Delaware. This illustrative horizontal system comprises a blocking oscillator with automatic pulse width control. The horizontal synchronizing pulses are applied with positive polarity from terminal 12 of the separator 11, through a coupling capacitor 13, to the grid of a triode 15. High voltage negative pulses obtained from the horizontal deflecting system are partially integrated and attenuated by a network comprising series resistor 16, series capacitor 17 and variable shunt capacitor 18 and are also applied to the grid of tube 15. Pulses of a third wave shape are obtained from the discharge capacitor 19 and integrated by a network comprising series resistor 20 and shunt capacitor 18 to form parabolic wave shapes. Tube 15 is the control tube and is biased near cut-off by the D. C. component of the oscillator grid voltage applied through resistors 22 and 23. The plate current of tube 15 consists essentially of pulses the width of each of which is determined by the relative phases of the synchronizing pulses from terminal 12 and the parabolic pulses formed by the network 18, 20. The voltage developed across a resistor 24 by this average plate current is injected from the cathode circuit of tube 15 into the grid of the blocking oscillator triode 25 by way of a resistor 26, in order to maintain the phase relationship between the oscillator output and the synchronizing signals. The cathode circuit of tube 15 is an integrating network comprising resistors 24, 27, 28 and capacitors 29, 30. This circuit has a fast response, in that capacitor 30 is small, and a slow response in that resistors 27 and 24 are large. The fast time-constant network tends to prevent hunting, while the slow time-constant network filters out disturbances of greater duration. The plate of the control tube is by-passed by a capacitor 31 and connected to an anode-voltage source through potentiometer 32. The automatic pulse width control circuit is fully described in the article entitled "Automatic Frequency Control of Television Circuits," Proceedings of the I. R. E., 1949, pp. 497 et seq., volume 37, No. 5, published by the Institute of Radio Engineers, May 1949.

The plate current flow of tube 15, passing through cathode resistor 24, controls the grid circuit time constant of the blocking oscillator tube 25 to produce synchronism, this resistor being common to the grid circuit of tube 25 and a time-constant circuit comprising capacitor 34, resistor 26, and resistor 24.

The blocking oscillator circuit comprises a triode 25, an auto-transformer 35, arranged in a series combination with capacitor 34, coupled between plate and grid, and a discharge capacitor 19, effectively coupled between a tap 36 on the auto-transformer and ground. A resonant circuit, comprising a parallel combination of an inductor 42, a capacitor 38, and a damping resistor 39, is interposed between this tap and the high potential terminal of capacitor 19. Plate voltage is supplied to the blocking oscillator through a circuit comprising conductor 40, dropping resistor 41, inductor 42, tap 36, and a part of auto-transformer 35. The sawtooth voltages employed for horizontal deflection are developed across discharge capacitor 19, tube 25 functioning not only as a blocking oscillator tube but also as a discharge tube.

The discharge capacitor is coupled, as by a capacitor 43, a grid resistor 44 and a series resistor 45, to the grid of a horizontal output amplifier tube 46, the latter being provided with a cathode resistor 47, by-passed by a capacitor 48. The output of this amplifier stage is coupled by a transformer network 49, 50 to the horizontal deflecting coils 51, and the current waves appearing in the plate circuit of tube 46 are employed periodically to produce sawtooth currents of line frequency in coils 51, thereby to deflect the electronic beam in the picture tube at line frequency.

The circuits intercoupling the horizontal output tube 46 and the deflection yoke 51 will be understood by reference to the following patents and publications: Kiver, Television Simplified, pp. 207–213, second edition, 1948, D. Van Nostrand, Inc., New York; U. S. Patent No. 2,440,418, Tourshou. The primary 49 is coupled to a secondary 50 comprising series portions 52, 53, portion 53 being connected across the deflecting coils circuit 51. For purposes of width control there is connected in shunt with yoke 51 an inductor 54, the function of which is well known to the art and is considered in such patents as U. S. Patent 2,449,969 to Wright. It will be understood that the coils 51 form part of a yoke assembly embracing the neck of a cathode ray image reproducing tube (not shown).

The voltage variations applied to the control electrode of power tube 46 produce an increasing plate current in that tube during scansion, which current is cut off at the beginning of retrace time. The current in the deflection coils 51 and the horizontal output transformer does not disappear at the instant of cut-off of tube 46, however, due to the inherent distributed capacity of the circuit. The inductance of these coils and transformer, together with the above-mentioned distributed capacity, forms a tuned circuit in which high frequency oscillations can be produced. Oscillation begins with the start of retrace time (cut-off of tube 46) and continues for one-half cycle, the oscillation being stopped at the negative current peak by a series combination of a diode 55 and a capacitor 56, connected across the output transformer secondary. The polarities immediately following retrace are such that damper tube 55 conducts and continues to conduct until tube 46 again becomes conductive. The voltage developed across capacitor 56 is such as to increase or boost the voltage of the D. C. power source connected to terminal 57. Terminal 57 will hereinafter be referred to as "+B." It represents the positive terminal of an anode voltage supply source (not shown) for the tubes 15, 25, and 46, this source being separate and apart from the high voltage source for the second anode of the picture tube. Particular attention is directed to the fact that the voltage applied to the anodes of those three tubes is obtained from a point at which the voltage is equal to the sum of the +B voltage and the "boost" voltage existing across the power-recovery capacitor 56. Capacitor 56 is charged during each conduction period of damper tube 55, thereby recovering from the deflecting system some of the energy dissipated by the collapsing field. The flow of "boost current" into this capacitor is substantial. The magnitude of the current is functionally related to the magnitude of the deflecting current in the output transformer and therefore is functionally related to the magnitude of the flyback-source-developed potential applied to the second anode of the picture tube. The voltage across booster 56 ($E_b$) is approximately proportional to the horizontal deflection current. For a constant width, this deflection current is proportional to the square root of the picture tube second anode voltage. I utilize this potential ($E_b$) across booster 56 to perform a control function. Specifically, in accordance with the present invention this potential is utilized to control the vertical deflecting system is such a way that an increase in vertical deflecting current is produced when the flyback power supply output voltage increases, and a decrease in vertical deflecting current is produced when an increase in deflection sensitivity is caused by a decrease in flyback power supply output voltage. The invention broadly embraces the use of energy recovered from the horizontal deflecting system to control the magnitude of the energy output of the vertical deflecting system. Terminal 58, the high potential side of capacitor 56, is hereinafter referred to as the "+B Boost" terminal. The voltage between terminals 58 and 57 is referred to as $E_b$. The voltage between terminal 57 and ground is referred to as +B.

The primary winding 49 of the horizontal output transformer is connected to a capacitor 59 in such a way that a varying voltage is developed across capacitor 59, which voltage is applied to capacitor 56 through inductor 60, for purposes of linearity control, as explained in the aforementioned Tourshou Patent 2,440,418. Conductor 40, the anode supply line for tubes 15 and 25, is connected to the "+B Boost" terminal 58 by a series resistor 61, shunt capacitor 62, filter network. The plate current path of output tube 46 may be traced through primary 49, inductor 60, diode 55, secondary 50, to terminal 57 (+B). It will be noted that capacitor 56 is in shunt with that portion of this path which comprises diode 55 and secondary 50, so that the anode voltage applied to tube 46 is the sum of the +B voltage and the voltage across power-recovery capacitor 56.

A conventional flyback supply source is indicated. It comprises a rectifier tube 65, for rectifying the high voltage induced in series windings 66 and 49 of the output transformer during retrace intervals, a filament-supply winding 67 and a filter network comprising series resistor 68 and shunt capacitor 69. A very high voltage is available at high-potential terminal 70, which is usually connected to the accelerating or second anode of a cathode-ray tube. It will be understood that the voltage fluctuation at terminal 70 is the factor which tends to disturb the aspect ratio, in that it affects the "stiffness" of the cathode ray beam. This factor is accompanied by: (1) a change in horizontal deflection current in yoke 51, which opposes the factor in such a way that picture width is not adversely affected; and therefore (2) a change in the boost potential across capacitor 56. This invention is premised on the concept of utilizing item (2) to control the ultimate flow of vertical deflection current in such a way that picture height is not adversely affected. It should be particularly observed that the use of the power recovery capacitor 56 as a source of current for this purpose does not impose a load on the high voltage rectifier tube 65. Further, the load on the boost circuit (of element 56) represented by the charging circuit of capacitor 77 is so small as to be negligible.

The horizontal deflection circuits having been discussed, the description proceeds to the vertical deflection system. The vertical system comprises a vertical blocking oscillator tube 75, a power amplifier tube 76, and a sawtooth capacitor 77. In this illustrative embodiment of the invention I utilize the boost voltage existing between terminals 58 and 57 of the horizontal deflection system to charge the vertical sawtooth capacitor and in this manner I increase vertical deflection current when there is an increase in boost voltage ($E_b$) and decrease such current when boost voltage decreases. If the cathode of the blocking oscillator were connected to ground, then the voltage $(+B+E_b)$ would be effectively applied across the series combination of inductor 60, filter resistor 80, portion 81 of resistor 82, resistor 83, and the plate resistance and other plate load components of oscillator tube 75, and a portion of the voltage $(+B+E_b)$ would be applied to the series combination comprising capacitor 77, resistors 84 and 85, and portion 86 of resistor 87. If such cathode were so connected to ground the control factor would be the voltage $(+B+E_b)$. This voltage is not so effective a control factor as the boost voltage alone ($E_b$), which is of a lower order of magnitude and is proportional to changes in horizontal output current. In accordance with the invention, I connect the cathode of tube 75 to terminal 57 (+B) and resistor 80 to terminal 58 (+B Boost) so that the voltage across the series combination of inductor 60, filter resistor 80, portion 81 of resistor 82, resistor 83, and the plate resistance and other plate load components of oscillator tube 75 is now $E_b$ only. Therefore, the boost voltage alone controls the amount of charge developed on capacitor 77 and the charging potential level at terminal 86 of the sawtooth capacitor 77 is determined by $E_b$ alone. The other terminal of capacitor 77 may be returned to any point of fixed potential.

Vertical synchronizing impulses are applied to the input circuit of blocking oscillator tube 75, which functions as a switching tube at field frequency to provide a short time-constant discharge path for capacitor 77. The plate and grid circuits of tube 75 are inductively coupled by a transformer 88, a blocking condenser 89 being interposed between grid winding and grid. A resistor 90 and an adjustable resistor 91, arranged in series between grid and cathode of tube 75, provide a leakage path for the electrical charge stored in condenser 89. Resistor 91 is adjustable to control the grid-circuit time-constant to vary the period of nonconductivity of the oscillator plate circuit, and is known as the "Vertical Hold Control." Anode voltage ($E_b$) for this tube is supplied from terminals 57, 58, terminal 57 being connected to the cathode and terminal 58 being connected to an adjustable tap on resistor 82, through inductor 60 and a filter consisting of series resistor 80 and shunt capacitor 95.

Resistor 82, in the feed circuit of the anode of tube 75, is adjustable to vary the time constant of the charging path for capacitor 77, and to determine the peak voltage to which capacitor 77 is charged. Resistor 82 therefore constitutes the "Vertical Height Control." The operation of blocking oscillators is fully described in the prior art, as in U. S. Patent 2,101,520 to Tolson, for example.

Sawtooth capacitor 77 is in series with peaking resistor 84, which is connected to the high-potential side of the cathode-biasing resistance of tube 76, consisting of resistor 85 and variable resistor 87. Capacitor 77 is periodically charged through the time-constant circuit comprising terminal 58, resistor 80, portion 81 of resistor 82, resistor 83, capacitor 77, and resistor 84, and the voltage to which capacitor 77 is charged depends on $E_b$, which in turn varies in a direction opposite to deflection sensitivity of the cathode ray tube.

The sawtooth capacitor output is applied to amplifier tube 76 by a coupling capacitor 97 and grid resistor 98. The cathode of this tube is connected to self-biasing resistance 85, 87, by-passed by capacitor 99. The anode is connected to +B terminal 57 through the primary of transformer 100 and a resistor 101. The secondary of the transformer is coupled to the vertical deflecting windings 102, one lead being connected to resistor 101. Resistor 101 and shunt capacitor 94 constitute a filter. Tube 76 functions as a power amplifier periodically to develop sawtooth waves of current in vertical yoke 102. The magnitude of these waves varies in the same direction as: (1) the magnitude of the sawtooth voltage applied to the input of tube 76, or (2) $E_b$, or (3) horizontal deflection current. Therefore changes in such magnitude are in a direction opposite to changes in deflection sensitivity caused by changes in horizontal deflection current.

The following parameters were found to be satisfactory in one successful embodiment of the invention:

| | |
|---|---|
| Resistor 23 | 680,000 ohms |
| Resistor 20 | 150,000 ohms |
| Resistor 28 | 8,200 ohms |
| Resistor 27 | 150,000 ohms |
| Resistor 24 | 150,000 ohms |
| Resistor 22 | 2.7 megohms |
| Resistor 32 | 268,000 ohms |
| Resistor 110 | 10,000 ohms |
| Resistor 26 | 100,000 ohms |
| Resistor 39 | 22,000 ohms |
| Resistor 41 | 100,000 ohms |
| Resistor 44 | 1 megohm |
| Resistor 45 | 47 ohms |
| Resistor 47 | 82 ohms |
| Resistor 111 | 5,600 ohms |
| Resistor 61 | 10,000 ohms |
| Resistor 80 | 82,000 ohms |
| Resistor 112 | 10,000 ohms |
| Resistor 113 | 3.3 ohms |
| Resistor 68 | 1 megohm |
| Resistor 90 | 1.2 megohms |
| Resistor 91 | 1.5 megohms |
| Resistor 16 | 560,000 ohms |
| Resistor 83 | 220,000 ohms |
| Resistor 82 | 2.5 megohms |
| Resistor 84 | 5,600 ohms |
| Resistor 98 | 2.2 megohms |
| Resistor 85 | 2,700 ohms |
| Resistor 87 | 5,000 ohms |
| Resistor 101 | 4,700 ohms |
| Resistor 114 | 10,000 ohms |
| Resistor 115 | 1,000 ohms |
| Resistor 116 | 1,000 ohms |
| Tube 15 | ½ 6SN7GT |
| Tube 25 | ½ 6SN7GT |
| Tube 46 | 6BG6G |
| Tube 65 | 1X2 |
| Tube 55 | 6W4GT |
| Tube 75 | 6C4 |
| Tube 76 | 6K6GT |
| Capacitor 18 | 30–260 mmf. |
| Capacitor 94 | 10 mfd. |
| Capacitor 29 | 0.25 mfd. |
| Capacitor 30 | 0.02 mfd. |
| Capacitor 13 | 0.0022 mfd. |
| Capacitor 31 | 0.05 mfd. |
| Capacitor 34 | 200 mmf. |
| Capacitor 38 | 0.01 mfd. |
| Capacitor 19 | 1,800 mmf. |
| Capacitor 43 | 390 mmf. |
| Capacitor 117 | 10–160 mmf. |
| Capacitor 48 | 5 mfd. |
| Capacitor 118 | 0.5 mfd. |
| Capacitor 8 | 0.5 mfd. |
| Capacitor 62 | 0.5 mfd. |
| Capacitor 56 | 0.1 mfd. |
| Capacitor 69 | 500 mmf. |
| Capacitor 119 | 56 mmf. |
| Capacitor 17 | 5 mmf. |
| Capacitor 89 | 0.0047 mfd. |
| Capacitor 95 | 10 mfd. |
| Capacitor 77 | 0.05 mfd. |
| Capacitor 99 | 100 mfd. |
| Capacitor 97 | 0.1 mfd. |
| Capacitor 59 | 0.1 mfd. |

Voltages:

| | |
|---|---|
| +B | 360 volts |
| $E_b$ | 200 volts |
| At terminal 58 | 580 volts Relative to ground |

Coming now to describe the operation of the invention, it will be understood that tubes 15, 25, 46, and 55 cause deflection current to flow in horizontal deflection windings 51.

When the picture-tube second anode current increases, the horizontal deflection current decreases and the power recovered from the horizontal deflection yoke and output circuit also decreases and the boost voltage at terminal 58 decreases. The invention teaches the use of this voltage to "drive the vertical system less hard" in such a way as to compensate for the increase in deflection sensitivity of the cathode ray tube (due to the lower second anode voltage), and conversely.

Sawtooth capacitor 77 is periodically charged from the boost voltage source and periodically discharged at field frequency through the discharge path provided by tube 75. The sawtooth capacitor potential drives power amplifier 76 to develop field-frequency sawtooth current waves in the vertical deflection windings 102. Under the assumed condition, the increase in boost voltage increases the peak voltage to which capacitor 77 is charged, causing an increase in vertical deflecting current in windings 102, which compensates for the decrease in deflection sensitivity of the cathode ray and maintains constant the picture height. Conversely, when the voltage at terminal 70 decreases, the voltage at terminal 58 also decreases, and the resultant decrease in vertical deflecting current in windings 102 compensates for the increase in deflection sensitivity and preserves the desired aspect ratio.

It will be understood that various changes and substitutions of equivalents may be made without departing from the true scope of the invention. For example, various power-recovery systems may be employed to supply the boost voltage. Such systems are shown in: U. S. Patents 2,440,418 to Tourshou, 2,458,532 to Schlesinger, 2,478,744 to Clark, 2,477,557 to Torsch, 2,474,474 to Friend, 2,451,641 to Torsch.

While in the specific embodiment shown the boost voltage is utilized to charge the sawtooth capacitor in the vertical deflection system, it will be understood that the invention, in its broad aspects, covers the use of this voltage to control the extent of vertical deflection.

Having thus fully disclosed and described the invention, I claim:

1. In a television receiver of the type which includes a horizontal deflecting system having an energy-storage device for recovering feed-back power from the output of the horizontal system, a picture tube having an anode, a flyback power supply energized by said horizontal system for developing the high-potential applied to said anode, and a vertical deflecting system, the deflection sensitivity of said tube being varied by changes in the picture-tube current, the improvement which comprises means included in the vertical deflection system for controlling the magnitude of the field-frequency output current of said vertical deflecting system, and means for coupling said energy storage device to the last-named means in such a way as to vary said magnitude in a manner compensatory of deflection sensitivity variation.

2. In a television receiver of the type which includes a horizontal electromagnetic deflecting system having an energy-storage device consisting of a capacitor in series with a damper tube for recovering feed-back power from the output of the horizontal system, a cathode ray tube having an anode, a flyback power supply energized by said horizontal system for developing the high-potential applied to said anode, and a vertical electromagnetic deflecting system, the deflection sensitivity of said cathode ray tube being varied by changes in the picture-tube current, the improvement which comprises another capacitor included in the vertical deflection system for controlling the magnitude of the saw-tooth field-frequency current of said vertical deflecting system, and a conductive path for connecting said other capacitor to the first-named capacitor as a charging source in such a way as to vary said magnitude in a manner compensatory of deflection sensitivity variation.

3. In a television receiver of the type which includes a horizontal electromagnetic deflecting system having an energy-storage device consisting of a capacitor in series with a damper tube for recovering feed-back power from the output of the horizontal system, a cathode ray tube having an anode, a flyback power supply energized by said horizontal system for developing the high-potential applied to said anode, and a vertical electromagnetic deflecting system, the deflection sensitivity of said cathode ray tube being varied by changes in the picture-tube current, the improvement which comprises another capacitor and a blocking-oscillator discharge tube, means included in the vertical deflection system for controlling the magnitude of the saw-tooth field frequency current of said vertical deflecting system, a conductive path for connecting one terminal of said other capacitor and the anode of said discharge tube to the high-potential terminal of the first-named capacitor as a charging source in such a way as to vary said magnitude in a manner compensatory of deflection sensitivity variation, and a conductive path connecting the other terminal of said first-named capacitor to the cathode of said discharge tube.

4. In a television receiver, the combination of a horizontal electromagnetic deflecting system having an energy-storage capacitor in series with the horizontal output tube anode and also in series with the damper tube for recovering feed-back power from the output of the horizontal system, a picture tube having an anode, a flyback power supply energized by said horizontal system for developing the high-potential applied to said anode, a vertical deflecting system, the deflection sensitivity of said tube being varied by changes in the picture-tube current, means included in the vertical deflection system for controlling the magnitude of the field-frequency output waves of said vertical deflecting system, and means for coupling the high-potential terminal of said energy-storage capacitor to the last-named means in such a way as to vary said magnitude in a manner compensatory of deflection sensitivity variation.

5. In a television receiver, the combination of a horizontal deflecting system, means including an energy-storage capacitor for recovering feed-back power from the output of the horizontal system, a vertical deflecting system, and means energized by said capacitor for controlling the magnitude of the wave-energy output of said vertical deflecting system.

6. In a television receiver of the type having horizontal and vertical deflecting systems, the combination of an output driver tube for the horizontal deflecting system, means for recovering power from the horizontal output and supplying it to said driver tube, and means controlled by the last-named means for determining the peak magnitude of the output waves of the vertical deflecting system.

7. In a television receiver having a horizontal deflecting system and a vertical deflecting system, the combination of means including capacitance for recovering power from the horizontal system, and means charged by said capacitance for controlling the operation of said vertical deflecting system.

8. In a television receiver of the type having a horizontal deflecting system and a vertical deflecting system, means for determining the height of the image raster, and power-recovery means included in the horizontal system and coupled to the last-named means for maintaining constant such height.

HANS G. SCHWARZ.

REFERENCES CITED

The following references are of record in the file of this patent:

UNITED STATES PATENTS

| Number | Name | Date |
|---|---|---|
| 2,440,787 | Schade | May 4, 1948 |
| 2,451,641 | Torsch | Oct. 19, 1948 |